United States Patent
Yuasa et al.

[11] Patent Number: 5,967,942
[45] Date of Patent: Oct. 19, 1999

[54] GEARSHIFT PRESSURE CONTROLLER USING TORQUE RATIO OF ONCOMING/OFFGOING ELEMENTS AND INPUT TORQUE

[75] Inventors: Hiroyuki Yuasa; Masuo Kashiwabara; Kaname Suehiro; Masanobu Horiguchi, all of Gunma; Susumu Morita, Niigata, all of Japan

[73] Assignee: Unisia Jecs Corporation, Atsugi, Japan

[21] Appl. No.: 09/132,765

[22] Filed: Aug. 12, 1998

[30] Foreign Application Priority Data

Aug. 12, 1997 [JP] Japan .................................. 9-217501

[51] Int. Cl.$^6$ ............................. F16H 61/06; F16H 59/14
[52] U.S. Cl. ............................ 477/156; 477/143; 477/110
[58] Field of Search ..................................... 477/107, 110, 477/120, 143, 156, 158

[56] References Cited

U.S. PATENT DOCUMENTS

| | | | |
|---|---|---|---|
| 5,776,030 | 7/1998 | Minowa et al. | 477/143 X |
| 5,792,021 | 8/1998 | Minowa et al. | 477/156 X |
| 5,888,171 | 3/1999 | Sasaki et al. | 477/158 X |

Primary Examiner—Khoi Q. Ta
Attorney, Agent, or Firm—Foley & Lardner

[57] ABSTRACT

A gearshift controller for an automatic transmission comprises an input shaft torque estimating portion for estimating the input shaft torque, a torque dividing ratio setting portion for setting the torque dividing ratio for each friction member of each gear range, and a desired torque calculating portion for calculating the desired torque of each friction member on the basis of the input shaft torque and the torque dividing ratio, and a desired hydraulic fluid calculating portion for calculating the desired hydraulic fluid pressure for each friction member on the basis of the desired torque of the each friction member, and a hydraulic fluid controlling portion for providing the desired hydraulic fluid pressure to each friction member.

16 Claims, 7 Drawing Sheets

|   | FWD/C | L&R/B | B/B | H/C | R/C |
|---|---|---|---|---|---|
| 1 | ○ | ● |   |   |   |
| 2 | ○ |   | ○ |   |   |
| 3 | ○ |   |   | ○ |   |
| 4 |   |   | ○ | ○ |   |
| R |   | ○ |   |   | ○ |

○ ENGAGING

● ENGAGING ON FIRST RANGE

FIG.7

GEARSHIFT PRESSURE CONTROLLER USING TORQUE RATIO OF ONCOMING/ OFFGOING ELEMENTS AND INPUT TORQUE

BACKGROUND OF THE INVENTION

1. Field of the Invention

The present invention relates to improvements to a gear shift controller for an automatic transmission, such as improved control of hydraulic fluid when the gear shift is executed.

2. Description of the Related Art

One way clutches have been used in automatic transmissions in order to avoid the complexity during a gear ratio change of disengaging one friction element and simultaneously engaging another friction element. Depending on whether the gear ratio change is an upshift or downshift, the one way clutch either releases or overruns during the period when the oncoming friction element is pressurized and engaged to complete the new driving connection among the components of the gear sets that produce the new gear ratio. If the one way clutch can be eliminated from an automatic transmission, its cost, weight, and size can also be eliminated.

A Japanese Patent Application First Publication No. Heisei 4-188572, published on Jun. 23, 1992, exemplifies a previously proposed gearshift controller for an automatic transmission in which the gear shift (clutch to clutch gear shift) can be actuated by a combination of an oncoming friction element and an offgoing friction element instead of a one way clutch.

In this Japanese Patent Application, the amount of hydraulic fluid pressure provided to these friction elements is provided on the basis of the speed of the input shaft of the automatic transmission. However, in the previously proposed gearshift controller for an automatic transmission, since the amount of hydraulic fluid pressure provided to these friction elements is provided on the basis of the input shaft speed, the hydraulic fluid pressure to the oncoming element and the offgoing element may be provided too early or too late due to a variation in input torque. When the change from the oncoming to the offgoing element occurs relatively late, the engine speed rises too high. When the change from the oncoming to the offgoing element occurs relatively early, engine speed reduction or torque reduction (commonly known as interlock) occurs.

SUMMARY OF THE INVENTION

It is, therefore, an object of the present invention to provide a gearshift controller for an automatic transmission which prevents an undesirable increase in engine speed and the occurrence of interlock and which also reduces the cost and the weight.

In view of the above, a gearshift controller for automatic transmission is disclosed, comprising: a) an input shaft torque estimating portion for estimating input shaft torque; b) a torque dividing ratio setting portion for setting a torque dividing ratio for each friction member of each gear range; c) a desired torque calculating portion for calculating a desired torque of each friction member on the basis of said input shaft torque and said torque dividing ratio; d) a desired hydraulic fluid calculating portion for calculating said desired hydraulic fluid of each friction member on the basis of said desired torque of said each friction member; and e) a hydraulic fluid controlling portion for providing said desired hydraulic fluid to each friction member.

This design not only prevents undesirable increases in engine speed and the occurrence of interlock, but also reduces the weight and lowers the cost of the automatic transmission since a one way clutch does not have to be used in the gearshift controller.

DETAILED DESCRIPTION OF THE PREFERRED EMBODIMENT

Figure 1:
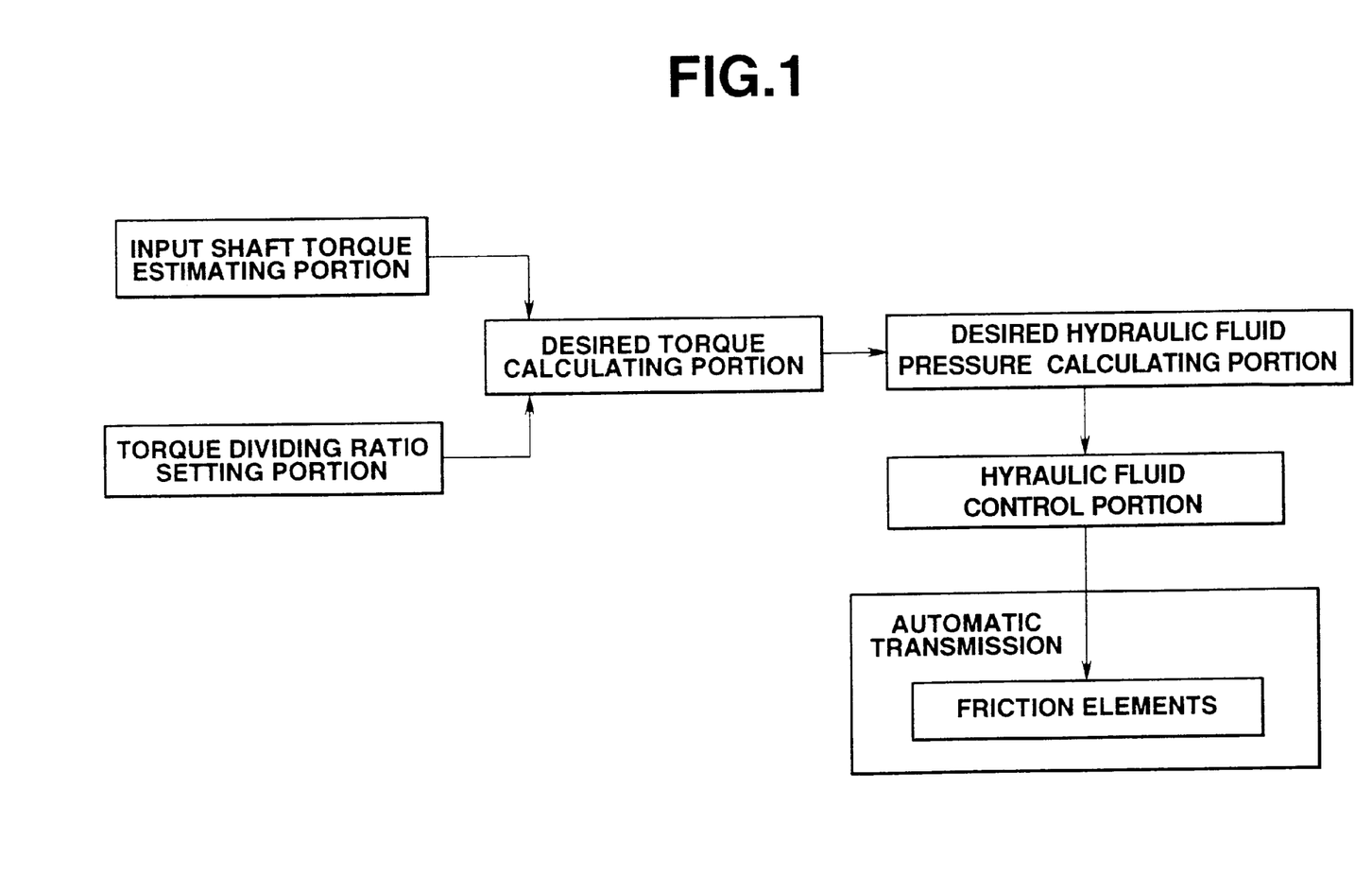
FIG. 1 is a block diagram of gearshift controller for an automatic transmission according to the present invention.
Figure 2:
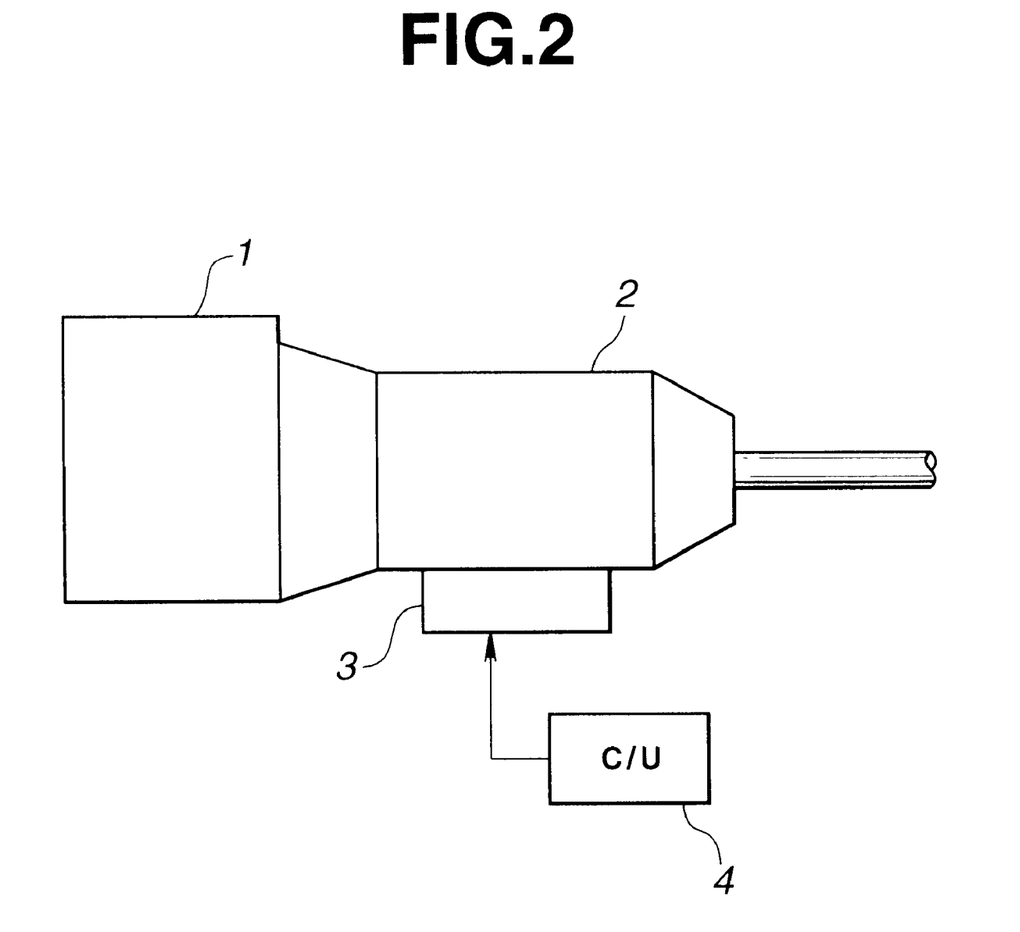
FIG. 2 is a system diagram of gearshift controller for an automatic transmission according to the present invention.

A more detailed description of the present invention is given below. FIG. 2 shows a system configuration of an automatic transmission according to the present invention. An output torque of an engine 1 is transmitted to drive wheels through the automatic transmission 2.

Figure 3:
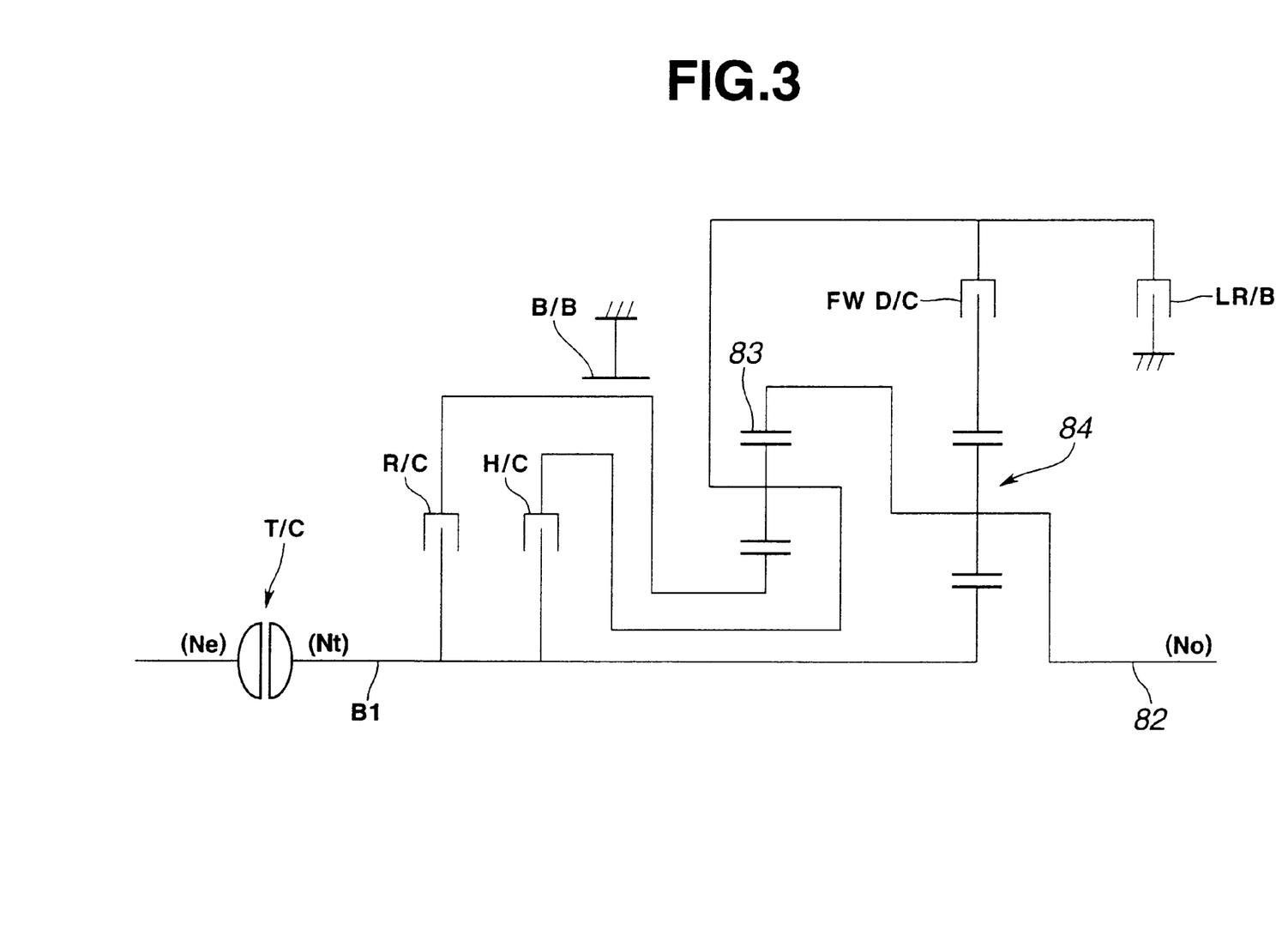
FIG. 3 is a detailed system diagram of gearshift controller for an automatic transmission according to the present invention.

The automatic transmission 2 has hydraulically actuated friction clutches and brakes (friction elements), which are controlled by a solenoid valve unit 3. The solenoid valve unit 3 actuates in response to control signals from a control unit 4 having a micro computer. To be more specific, the automatic transmission 2 receives the output torque of the engine through a torque converter T/C. The automatic transmission has front planet gear sets 83 and rear planet gear sets 84, as shown in FIG. 3. The automatic transmission 2 also has oncoming friction elements and offgoing friction elements, which include a reverse clutch J/C, a high clutch H/C, a band brake B/B, a low & reverse brake L&R/B, and a forward clutch FWD/C. Furthermore, FIG. 3 shows an input shaft 81, an output shaft 82, an engine speed Ne, a turbine speed Nt, and an output shaft speed No.

Figure 4:
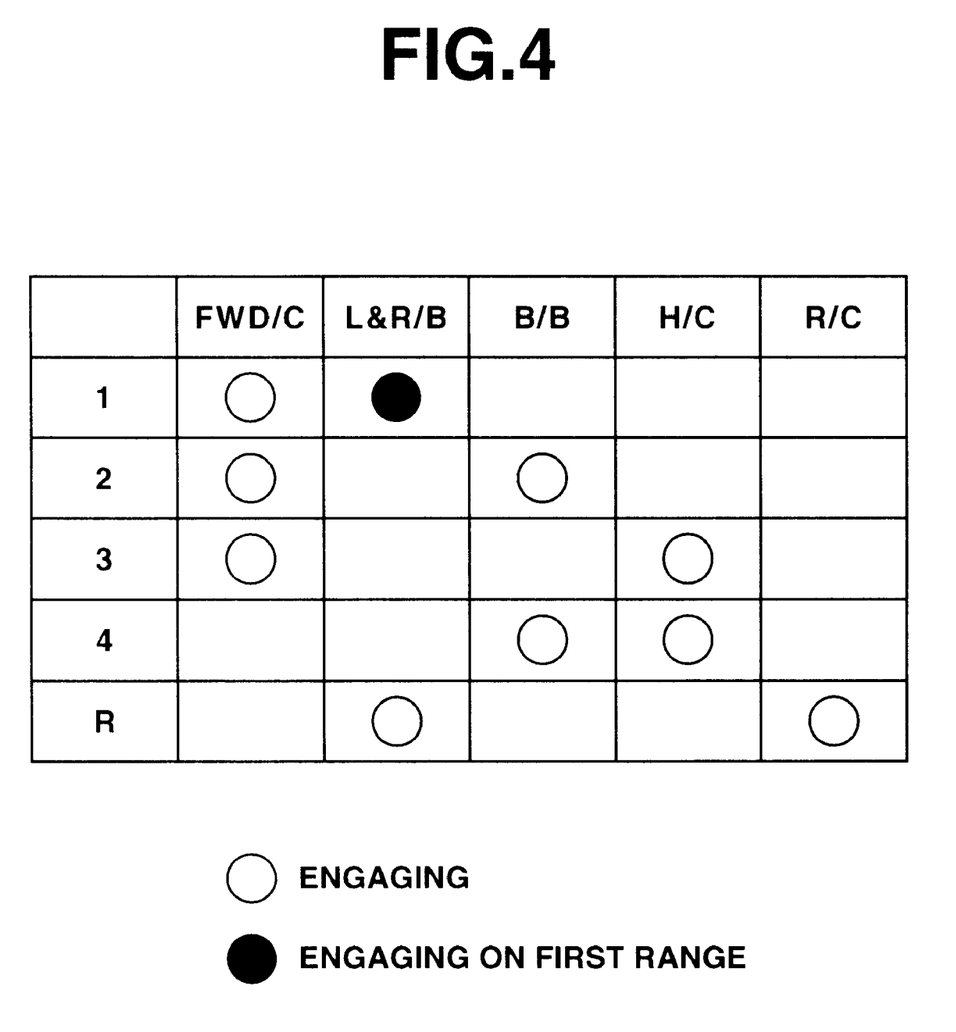
FIG. 4 is a gear shift diagram of gearshift controller for an automatic transmission showing combinations of the oncoming friction element and offgoing friction element.
Figure 5:
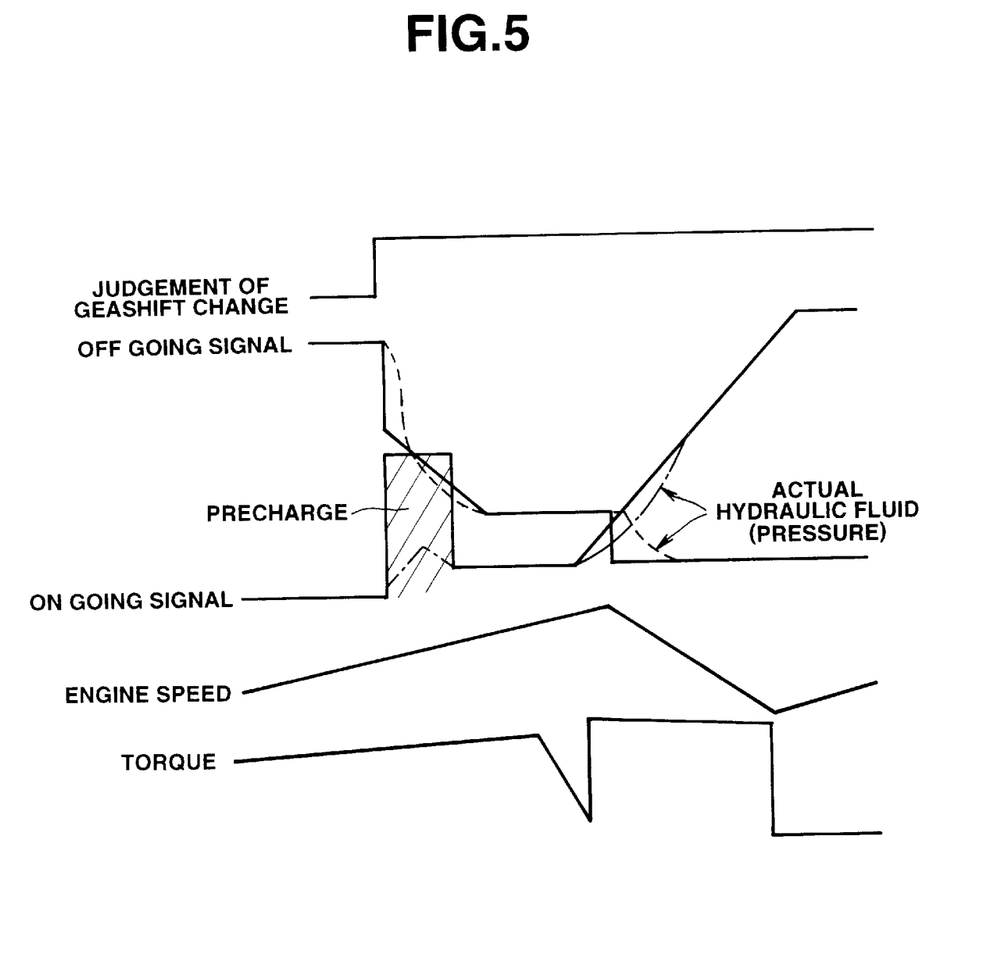
FIG. 5 is a time chart of the hydraulic fluid control when the clutch to clutch shift is executed.

A gear shift can be caused by selectivity engaging and disengaging the reverse clutch R/C, the high clutch H/C, the band brake B/B, the low & reverse brake L&R/B, and the forward clutch FWD/C, as shown in FIG. 4. For example, when an up gear shift is executed from range 3 to range 4, disengagement of the forward clutch FWD/C occurs simultaneously with engagement of the band brake B/B. In other words, the automatic transmission 2 associated with the present invention does not use a one way clutch, and a gear shift (clutch to clutch gear shift) can be caused by a combination of the oncoming friction element and offgoing friction element, which are controlled by hydraulic fluid, as shown in FIG. 5.

When engaging and disengaging friction elements, friction elements are first given an invalid stroke by a pre charge that bleeds the hydraulic fluid, the hydraulic fluid pressure is then maintained at a return pressure (critical pressure), which is capable of engaging and disengaging friction elements, and the hydraulic fluid pressure is controlled in such a manner as to engage and disengage friction elements according to a predetermined timing. Note that the return pressure corresponds to the strength of a return spring (an elastic member) which presses the friction elements in a disengagement direction.

Figure 6:
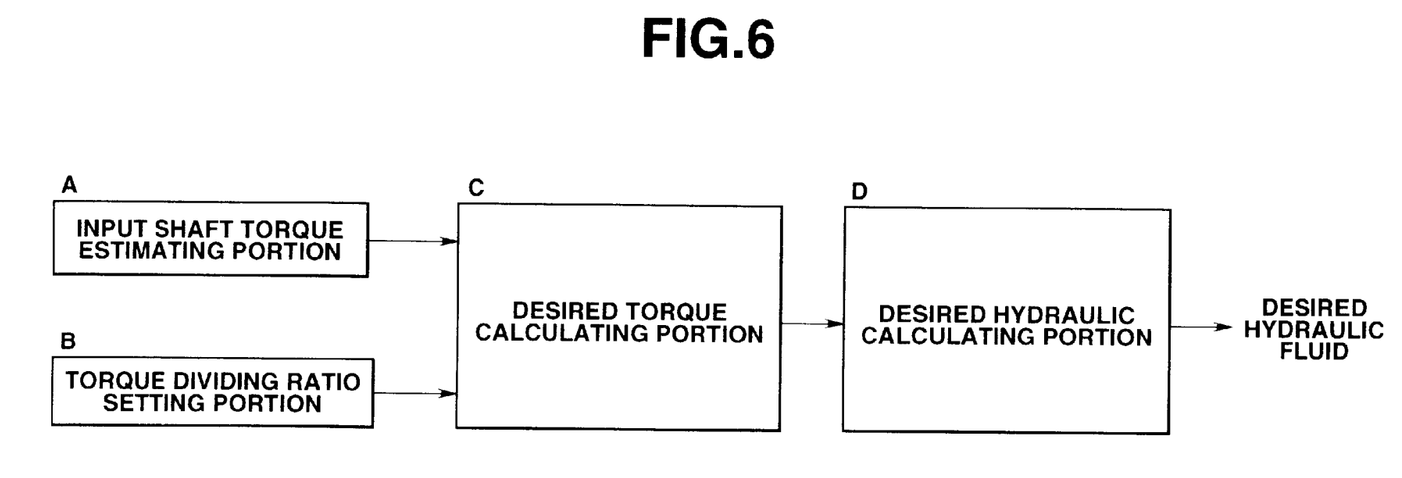
FIG. 6 is a control block diagram of the hydraulic fluid control according to the present invention.

A torque dividing ratio between the oncoming friction element and the offgoing friction element on the clutch to clutch gear shift is determined by the hydraulic fluid control, as shown in FIG. 6. An input shaft torque estimating portion A (an input shaft torque estimating means) determines an input shaft torque (a turbine torque) on the basis of a torque ratio of a torque converter and an engine output torque, which is determined on the basis of air flow rate and engine speed.

Figure 7:
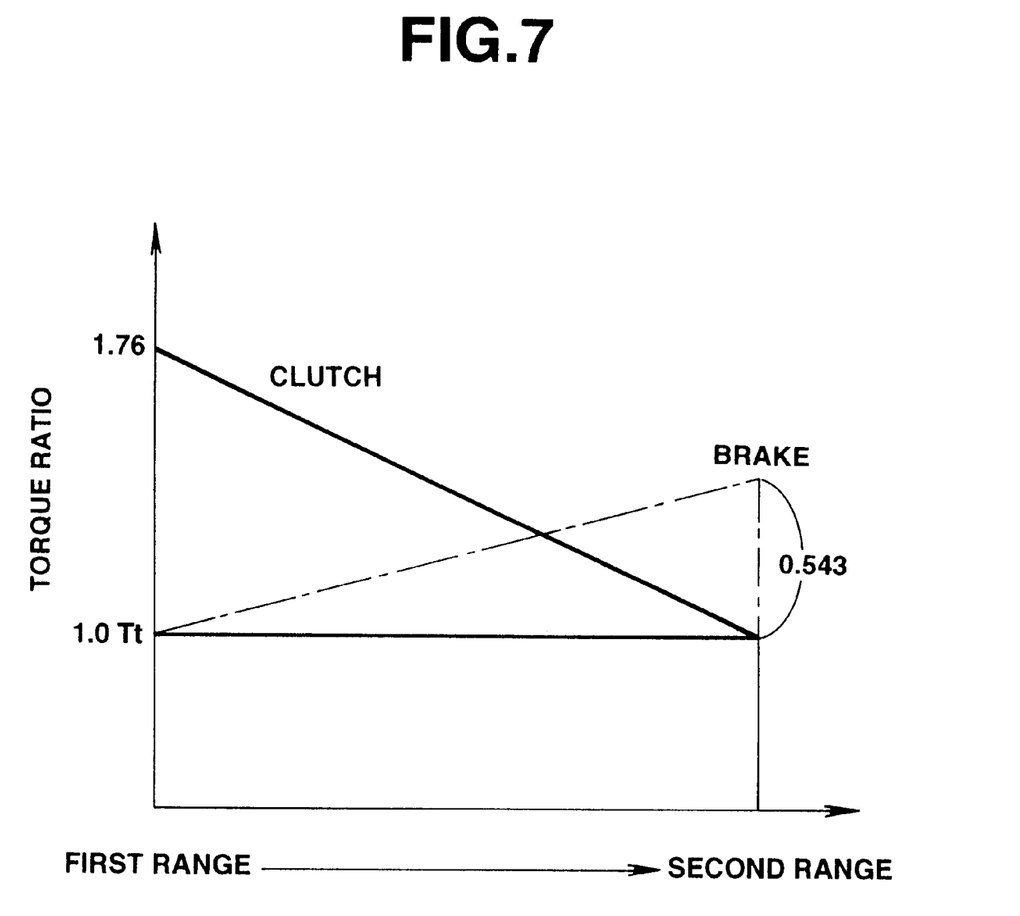
FIG. 7 is a sample line diagram of the torque dividing ratio.

A torque dividing ratio setting portion B (a torque dividing ratio setting means) stores the torque dividing ratio for each kind of gear shift. This torque dividing ratio is based on the gear range. The torque dividing ratio is the ratio between the torque of the offgoing friction element and the torque of the oncoming friction element. During gear shifting, the torque dividing ratio changes proportionally from the torque dividing ratio of the gear before shifting to the torque dividing ratio of the gear after shifting, as shown in FIG. 7.

A desired torque calculating portion C (a desired torque calculating means) calculates the desired torque from each friction element during the gear shift on the basis of the input shaft torque, which is estimated by the input shaft torque estimating portion A, and the torque dividing ratio, which is set by the torque dividing ratio setting portion B, based on the following expression:

$$\text{desired torque} = \text{the torque dividing ratio} \times \text{the input shaft torque} \times \text{a gain}$$

A desired hydraulic fluid pressure calculating portion C (a desired hydraulic fluid pressure calculating means) calculates the desired hydraulic fluid pressure for getting the desired torque from each friction element based on the following expression:

$$\text{desired hydraulic fluid pressure} = 1/A\{(Ti/(N\mu D)) + F\}$$

where:

A is an area of a clutch piston ($cm^2$);

T is the input shaft torque (kg·m);

$\mu$ is a coefficient of friction between a driven plate and a drive plate;

D is an effective diameter of the clutch facing material [(outer diameter-inner diameter)/2+inner diameter];

N is a number of sets of driven and drive plates;

i is the torque dividing ratio; and

F is force provided by the return spring of the clutch

When the desired hydraulic fluid pressure is calculated, a table, which contains a correlation between control signals to a solenoid valve and hydraulic fluid pressures, is referenced to determine the appropriate control signal.

After the control signal is determined, the control signal is output to the solenoid valve, which is controlled to provide the desired hydraulic fluid pressure.

When the input shaft torque varies, the present invention can provide the desired hydraulic fluid pressure to friction elements, and appropriately control the hydraulic fluid pressure provided to the oncoming friction element and offgoing friction element. As a result, the present invention can prevent undesirable increases in the engine speed and the occurrence of interlock.

The entire contents of Japanese Patent Application No. TOKUGANHEI 9-217501, filed Aug. 12,1997 is incorporated herein by reference.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed:

1. A gearshift controller for an automatic transmission that transmits torque from an input shaft through friction members that can be engaged or disengaged to cause a gear shift between different gear ranges, comprising:

a) an input shaft torque estimating portion for estimating input shaft torque;

b) a torque dividing ratio setting portion for setting a torque dividing ratio of torques of friction members for gear shifts between the gear ranges;

c) a desired torque calculating portion for calculating a desired torque for each friction member involved in a gear shift based on the input shaft torque and said torque dividing ratio set for the gear shift;

d) a desired hydraulic fluid calculating portion for calculating a desired hydraulic fluid pressure for each friction member involved in the gear shift based on said desired torque for the friction member; and     e) a hydraulic fluid controlling portion for providing the desired hydraulic fluid pressure to each friction member involved in the gear shift.

2. A gearshift controller as defined in claim 1, wherein each friction member includes a solenoid valve.

3. A gearshift controller as defined in claim 2, wherein said desired hydraulic fluid calculating portion has a table containing a correlation between control signals to the solenoid valves and hydraulic fluid pressures.

4. A gearshift controller as defined in claim 1, wherein said friction members include oncoming friction members and offgoing friction members.

5. A gearshift controller as defined in claim 4, wherein engagement of an oncoming friction member occurs simultaneously with disengagement of an offgoing friction member during a gear shift.

6. A gearshift controller as defined in claim 1, wherein said input shaft torque estimating portion estimates said input shaft torque based on an air flow rate, an engine speed, and a torque ratio of a torque converter.

7. A gearshift controller as defined in claim 1, wherein said desired torque calculating portion calculates said desired torque based on the following expression:

$$\text{desired torque} = \text{said torque dividing ratio} \times \text{said input shaft torque} \times \text{a gain}.$$

8. A gearshift controller as defined in claim 1 wherein said desired hydraulic fluid pressure calculating portion calculates said desired hydraulic fluid pressure based on the following expression:

$$\text{desired hydraulic fluid pressure} = 1/A\{(Ti/(N\mu D)) + F\}$$

where:

A is an area of a clutch piston;

T is said input shaft torque;

$\mu$ is a coefficient of friction between a driven plate and a drive plate;

D is an effective diameter of a clutch facing material;

N is a number of sets of driven and drive plates;

i is said torque dividing ratio; and

F is force provided by a return spring of a clutch.

9. A gearshift controller for an automatic transmission that transmits torque from an input shaft through friction members that can be engaged or disengaged to cause a gear shift between different gear ranges, comprising:

a) an input shaft torque estimating means for estimating input shaft torque;

b) torque dividing ratio setting means for setting a torque dividing ratio of torques of friction members for gear shifts between the gear ranges;

c) desired torque calculating means for calculating a desired torque for each friction member involved in a gear shift based on said input shaft torque and the torque dividing ratio set for the gear shift;

d) desired hydraulic fluid calculating means for calculating a desired hydraulic fluid pressure for each friction member involved in the gear shift based on said desired torque for the friction member; and e) hydraulic fluid controlling means for providing the desired hydraulic fluid pressure to each friction member involved in the gear shift.

10. A gearshift controller as defined in claim 9, wherein each friction member includes a solenoid valve.

11. A gearshift controller as defined in claim 10, wherein said desired hydraulic fluid calculating means has a table containing a correlation between control signals to the solenoid valves and hydraulic fluid pressures.

12. A gearshift controller as defined in claim 9, wherein said friction members include oncoming friction members and offgoing friction members.

13. A gearshift controller as defined in claim 12, wherein engagement of an oncoming friction member occurs simultaneously with disengagement of an offgoing friction member during a gear shift.

14. A gearshift controller as defined in claim 9, wherein said input shaft torque estimating means estimates said input shaft torque based on an air flow rate, an engine speed, and a torque ratio of a torque converter.

15. A gearshift controller as defined in claim 9, wherein said desired torque calculating means calculates said desired torque based on the following expression:

$$\text{desired torque} = \text{said torque dividing ratio} \times \text{said input shaft torque} \times \text{a gain.}$$

16. A gearshift controller as defined in claim 9, wherein said desired hydraulic fluid pressure calculating means calculates said desired hydraulic fluid pressure based on the following expression:

$$\text{desired hydraulic fluid pressure} = 1/A\{(Ti/(N\mu D)) + F\}$$

where:

A is an area of a clutch piston;

T is said input shaft torque;

$\mu$ is a coefficient of friction between a driven plate and a drive plate;

D is an effective diameter of a clutch facing material;

N is a number of sets of driven and drive plates;

i is said torque dividing ratio; and

F is force provided by a return spring of a clutch.

\* \* \* \* \*